US007860221B2

(12) United States Patent
Adkinson et al.

(10) Patent No.: US 7,860,221 B2
(45) Date of Patent: Dec. 28, 2010

(54) METHODS, SYSTEMS AND COMPUTER PROGRAM PRODUCTS FOR INVENTORY RECONCILIATION

(75) Inventors: Timothy K. Adkinson, Atlanta, GA (US); Carl E. Moering, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1603 days.

(21) Appl. No.: 10/974,873

(22) Filed: Oct. 27, 2004

(65) Prior Publication Data

US 2006/0059262 A1 Mar. 16, 2006

Related U.S. Application Data

(60) Provisional application No. 60/600,233, filed on Aug. 10, 2004.

(51) Int. Cl.
*H04M 1/24* (2006.01)
*H04M 3/08* (2006.01)
*H04M 3/22* (2006.01)

(52) U.S. Cl. .................. 379/9.02; 379/9.04; 379/15.03

(58) Field of Classification Search ............... 379/9.02, 379/9.04, 15.03, 114.04, 133–135, 201.01, 379/201.12; 705/28
See application file for complete search history.

(56) References Cited

U.S. PATENT DOCUMENTS

| 6,272,208 | B1* | 8/2001 | Kasrai ..................... 379/15.03 |
| 6,295,540 | B1 | 9/2001 | Sanschagrin et al. ........ 707/201 |
| 6,539,396 | B1 | 3/2003 | Bowman-Amuah ..... 707/103 R |
| 6,732,181 | B2 | 5/2004 | Lim et al. ................... 709/229 |
| 7,421,493 | B1* | 9/2008 | Adams ....................... 709/224 |
| 7,467,267 | B1 | 12/2008 | Mayock ...................... 711/162 |
| 2002/0194319 | A1 | 12/2002 | Ritche ......................... 709/223 |
| 2003/0014332 | A1* | 1/2003 | Gramling ..................... 705/28 |
| 2003/0142633 | A1* | 7/2003 | Wall et al. .................... 370/254 |
| 2004/0030705 | A1 | 2/2004 | Bowman-Amuah ......... 707/100 |
| 2004/0210662 | A1 | 10/2004 | Lim et al. .................... 709/229 |
| 2005/0015292 | A1 | 1/2005 | Wilson et al. ................. 705/9 |
| 2005/0015501 | A1 | 1/2005 | Kaplan et al. ............... 709/228 |
| 2005/0080663 | A1 | 4/2005 | Bauckmann ................. 705/11 |
| 2006/0059253 | A1 | 3/2006 | Goodman et al. ........... 709/223 |

(Continued)

OTHER PUBLICATIONS

Qwest, Wholesale: Operation Support Systems, Mediated Access Electronic Bonding Trouble Administration (MEDIACC—EBTA), http://www.qwest.com/wholesale/systems/mediacc-ebta.html, 2 pages, Apr. 15, 2005.

(Continued)

*Primary Examiner*—Quoc D Tran
(74) *Attorney, Agent, or Firm*—Myers Bigel Sibley & Sajovec

(57) ABSTRACT

Network asset recovery includes querying assets on a communications network to obtain a current inventory of the assets on the communications network and obtaining inventory data for the communications network from an inventory management database. The current inventory is compared with the inventory data from the inventory management database to identify a plurality of non-utilized assets. Asset type need data is obtained from a demand database and at least one of the non-utilized assets is identified for recovery based on the obtained asset type need data. The assets may be intelligent network elements and the communications network may be a telecommunications network.

36 Claims, 9 Drawing Sheets

U.S. PATENT DOCUMENTS

2006/0059262 A1 3/2006 Adkinson et al. ............ 709/225
2008/0183728 A1 7/2008 Cornelius et al. ............ 707/100
2009/0049057 A1 2/2009 Ghani ......................... 707/10

OTHER PUBLICATIONS

Qwest Wholesale, Local Business Procedures, Maintenance and Repair Overview—V70.0, http://www.qwest.com/wholesale/clecs/maintenance.html, 21 pages, Jan. 8, 2007.

Telcordia - Training- WFA Essentials - OnLine Live, WFA Essentials - OnLive Live, http://www.telecordia.com/training/course_desc.jsp?id=9775, 2 pages, Nov. 23, 2006.

Qwest, Wholesale: Operation Support Systems, Mediated Access Electronic Bonding Trouble Administration (MEDIACC - EBTA), http://www.qwest.com/wholesale/systems/mediacc-ebta.html, 2 pages, Apr. 15, 2005.

Qwest Wholesale, Local Business Procedures, Maintenance and Repair Overview - V70.0, http://www.qwest.com/wholesale/clecs/maintenance.html, 21 pages, Jan. 8, 2007.

* cited by examiner

METHODS, SYSTEMS AND COMPUTER PROGRAM PRODUCTS FOR INVENTORY RECONCILIATION

RELATED APPLICATIONS

This application claims the benefit of and priority to U.S. Provisional Patent Application No. 60/600,233 entitled "Telecommunications Network Inventory Data Reconciliation System and Methods of Operating the Same" filed Aug. 10, 2004, the disclosure of which is hereby incorporated herein by reference as if set forth in its entirety.

FIELD OF THE INVENTION

The present invention relates to telecommunication networks, and, more particularly, to inventory management for telecommunication networks.

BACKGROUND OF THE INVENTION

Inventory management for telecommunications networks generally tracks components, such as circuit cards, provided at different field locations to support different user services. Over time, the inventory database systems related to such assets may become inaccurate representations of the infrastructure as circuit cards and the like are changed over time to respond to different user requirements, discontinued services and the like. Such a data mismatch with the actual network configuration may lead to problems in customer service, outages, lost revenues from unbilled circuits, loss of use of capital assets and stress on employees from relying on data that does not match actual network field conditions. Effort by field technicians may be required to call attention to the mismatches as discovered in the field.

Many of today's intelligent network elements (INEs) have the ability to report their configuration to an external management system either on request or autonomously as changes occur.

TIRKS™ (Trunk Integrated Record Keeping System) is a Telcordia integrated, computerized network inventory and assignment system that supports the provisioning process for special service circuits, message trunks, and carrier circuits, and also provides inventory management of facilities and equipment. The TIRKS system supports the full range of transmission technologies, such as SONET, including self-healing rings and other sophisticated SONET configurations, European digital hierarchy standards (SDH), digital circuitry hierarchy (DS0, DS1, DS3), and analog voice circuits.

The TIRKS system allows users to automatically log, route, and monitor the progress of work orders (WO), perform end-to-end circuit design based on generic specifications and automated scripts, execute interactive, user-defined queries and generate customized reports of work center activity, critical dates, and jeopardy conditions, and interface seamlessly with other Telcordia operations support systems. However, discrepancies may occur from data entry errors, equipment not installed as planned, discrepancies between the actual plug-ins shipped from those expected, substitutions or errors by field personnel, or an element management system (EMS) being unable to make an assignment.

NORTEL'S integrated network management/manager (INM) broadband product is an open, multi-technology and multi-vendor distributed element management system. Nortel's Integrated Network Management (INM) Broadband EMS employs the philosophy of "the network is the database", and can make use of current technology to obtain an accurate, up-to-date view of the configurations of all the network elements that the INM controls. INM may consolidate and adapt information from the network under management control to open, standards-based interfaces. Communications with the managed network elements may be provided using TL1 (transaction language-1), SNMP (simple network management protocol), CMIP (common information management protocol) or proprietary protocols.

Synchronous Optical Network Capacity Activation Program (SONETCAP) is a BellSouth network communication product that may be connected to a telecommunications network. SONETCAP may be connected to and upload data from intelligent network equipment using TL1 commands to extract information related to circuit card configuration for a particular device, cross connections, any port in service and the like.

The TIRKS system databases do not always accurately reflect how the equipment is actually configured in the network. Inaccurate data can cause fallout in the provisioning process, stranding of equipment, and unnecessary dispatches resulting in increased costs, missed due dates, and customer dissatisfaction. Field conditions that may create database discrepancies include: assignment made by the provisioning system is actually in use and therefore not available, incorrect assignment based on incorrect view of the actual field conditions, missing equipment plug-ins in the field; and the EMS being unable to make assignment.

Current TIRKS users generally must contend with ongoing TIRKS database discrepancies between the facilities assignments associated with service or repair orders and the actual field conditions encountered. One known solution to update TIRKS databases is a manual solution. Subsequent to completing the service or repair order, work center personnel use the actual field information discovered using the INM broadband user interface (UI) to manually update the TIRKS database. This technique has been fairly successful, although disadvantages include the sheer amount of data (hence human effort) involved and its reactive versus proactive nature. This activity can sometimes lead to multiple database corrections because of numerous inaccuracies. In addition, for the most part, this update effort is triggered by service or repair activity and is not part of a programmed work effort.

Another proposed approach to alignment of TIRKS uses INM. A synchronizer receives data from the Network Manager and the TIRKS inventory data to determine data discrepancies. A discrepancy may be corrected automatically or manually.

SUMMARY OF THE INVENTION

In some embodiments of the present invention, methods for network asset recovery include querying assets on a communications network to obtain a current inventory of the assets on the communications network and obtaining inventory data for the communications network from an inventory management database. The current inventory is compared with the inventory data from the inventory management database to identify a plurality of non-utilized assets. Asset type need data is obtained from a demand database and at least one of the non-utilized assets is identified for recovery based on the obtained asset type need data. The assets may be intelligent network elements and the communications network may be a telecommunications network.

In other embodiments of the present invention, querying assets includes determining which of the assets are currently utilized, for example, by determining which of the assets have p port in service. An identification of ones of the assets scheduled to be utilized may be obtained and comparing the current inventory with the inventory data from the inventory management database may include identifying assets that are not currently utilized as non-utilized assets only if they are not scheduled to be utilized.

In further embodiments of the present invention, a work order requesting recovery of the at least one of the non-utilized assets is automatically generated and the generated work order is communicated to a work force control system. In addition, an identification of ones of the assets scheduled to be utilized and it may be determined if the work order requesting recovery of the at least one of the non-utilized assets requests recovery of one of the assets scheduled to be utilized. The work order may be updated to cancel requesting recovery of the one of the assets scheduled to be utilized if the work order requests recovery of the one of the assets scheduled to be utilized.

In other embodiments of the present invention, querying assets on the communications network includes determining active services supported by the assets. Billing information associated with the communications network is obtained that identifies valid services from a billing database and the identified valid services and the determined active services are compared to identify active services not corresponding to a valid service. An active service not corresponding to a valid service may be terminated or the billing database may be updated to incorporate an active service not corresponding to a valid service.

In further embodiments of the present invention, the inventory management database is updated based on the current inventory. The inventory management database may be an interoffice network database. The inventory management database may also be a plurality of inventory management databases including an interoffice network database and an outside plant database, each of which may be updated based on the current inventory. The outside plant database may be a database of assets on an outside plant portion of the communications network and a customer assignment database associating particular customers with an asset on the outside plant portion of the communications network.

In other embodiments of the present invention, identifying at least one of the non-utilized assets for recovery is followed by monitoring recovery of the at least one of the non-utilized assets by querying the at least one of the non-utilized assets to determine if it remains on the communications network at a determined time after identifying the at least one of the non-utilized assets for recovery.

In further embodiments of the present invention, querying assets includes determining a serial number associated with the assets. A product notification database is queried to receive a notification of a serial number of an asset having a defect and a work order is automatically generated requesting recovery of the asset having a defect responsive to the notification.

In yet other embodiments of the present invention, a request to set an option of a plurality of the assets on the communications network is received. The plurality of assets are automatically queried to set the option responsive the received request to set an option.

In yet further embodiments of the present invention, methods for network asset recovery include querying assets on a communications network to obtain a current inventory of the assets on the communications network and an identification of which of the assets on the communications network has a port in service. Inventory data is obtained for the communications network from an inventory management database. The current inventory and identification of which assets on the communications network has a port in service is compared with the inventory data from the inventory management database to identify a plurality of non-utilized assets. At least one of the non-utilized assets is identified for recovery.

In other embodiments of the present invention, methods for network asset revenue recovery include querying assets on a communications network to determine active services supported by the assets and obtaining billing information associated with the communications network that identifies valid services from a billing database. The identified valid services and the determined active services are compared to identify active services not corresponding to a valid service. Any active services not corresponding to a valid service are reconciled by, for example, terminating an active service not corresponding to a valid service or updating the billing database to incorporate an active service not corresponding to a valid service.

In further embodiments of the present invention, methods for network asset inventory reconciliation include querying assets on a communications network to obtain a current inventory of the assets on the communications network, obtaining inventory data for the communications network from an interoffice network database and obtaining inventory data for the communications network from an outside plant database. The inventory data from the interoffice network database and the outside plant database is reconciled to the current inventory.

In further embodiments of the present invention, methods for network asset recovery include querying assets on a communications network to obtain a current inventory of the assets on the communications network and obtaining inventory data for the communications network from an inventory management database. The current inventory is compared with the inventory data from the inventory management database to identify a plurality of non-utilized assets. At least one of the non-utilized assets is identified for recovery. A work order is automatically generated requesting recovery of the at least one of the non-utilized assets and the generated work order is communicated to a work force control system.

In other embodiments of the present invention, methods for updating intelligent network elements on a telecommunications network include receiving a request to set an option of a plurality of the assets on the communications network. The plurality of assets are automatically queried to set the option responsive the received request to set an option.

In yet further embodiments of the present invention, methods for recovery of intelligent network elements on a telecommunications network include querying the intelligent network elements to determine a serial number associated with the intelligent network elements. A product notification database is queried to receive a notification of a serial number of an intelligent network element having a defect. A work order requesting recovery of the intelligent network element having a defect responsive to the notification is automatically generated.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
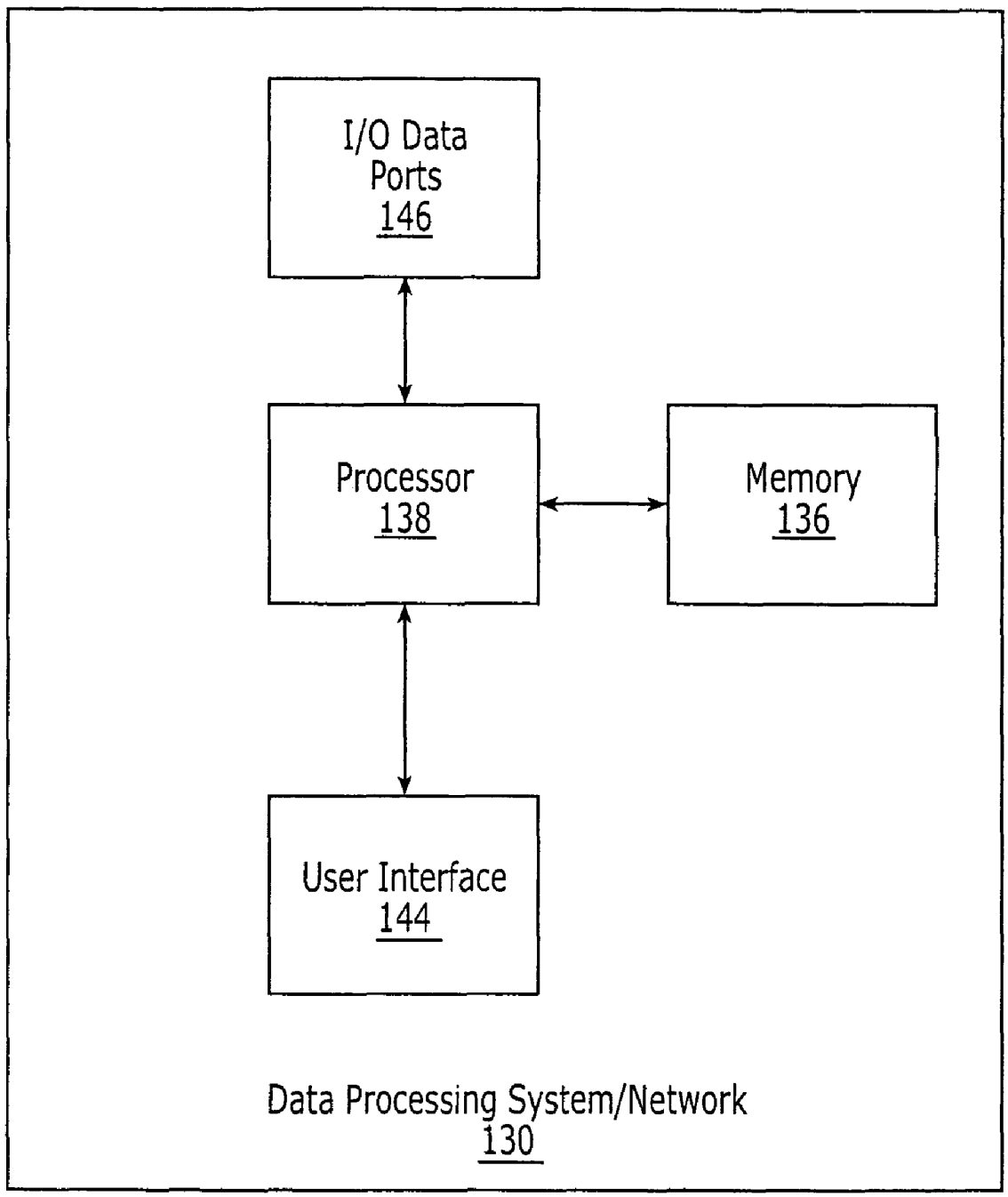
FIG. 1 is a block diagram illustrating a data processing system suitable for use in some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

By way of background, various telecommunication network providers (such as Regional Bell Operating Companies (RBOCs)) are actively investing in broadband resources, such as fiber to the home/business (FTTx), and/or adding more digital subscriber line (DSL) subscribers. Note that, as used herein, RBOC refers to any company offering communications services using a network that may benefit from various embodiments of the present invention as described herein.

The size of such investments bring into question where, with tight margins and the need for capital investment in the future, the capital to invest in FTTx and broadband to the masses will be found and how to sustain the commitment for the long-term.

Today, the United States communications system is comprised of millions of circuits manufactured by hundreds of companies with thousands of detailed specifications, one of the most complex systems on the planet. In addition to investing in emerging technologies, it may be desirable to find cost-efficient ways to harness the power of the legacy network and to recover dollars from the current network in order to invest in the future.

Some embodiments of the present invention are directed to inventory reconciliation systems and methods that may work behind the scenes and link into the nuts and bolts of a network. The systems and methods in some embodiments may quickly connect with thousands of network elements, inventory the circuit cards embedded in those elements and update the records of multiple inventory and equipment assignment databases.

For example, asset recovery may fuel future investments. An RBOC may execute several million network transactions each year to provide customers with telecommunications services that respond to each and every change in their demands. In the process, circuit cards (assets) vacated by a change order can become stranded in the network. Once stranded, these circuit cards, often costing thousands of dollars each, can be difficult to locate and recover.

In the past, circuit card recovery efforts could be labor intensive. Technicians were generally required to manually research records, physically trace cross-connections (or otherwise identify cards having a port in service), then perform circuit testing to hunt down the spare cards and collect them for reuse. Not only could this be costly, but it also could place burden on the work force. As a result, recovery efforts were typically limited, and millions of dollars of capital assets risked being trapped in the network.

To address this challenge, some embodiments of the present invention utilize technologies such as Synchronous Optical Network Capacity Activation Program (SONET-CAP) and Digital Cross-connect System (DCS). These technologies have the ability to report on the number and types of circuit cards (assets) plugged into network equipment and whether those cards are a part of an active customer circuit or not. However, without automated inventory reconciliation, there was generally no system to communicate with these technologies to effectively use this information.

Some embodiments of the present invention automatically establish communication links with each SONET and DCS network element and collect and interpret the information provided. With this approach a user may determine the location of all circuit cards and identify which cards are active or spare.

Data may then be collected from a number of the RBOC's inventory, assignment and accounting systems and business rules may be employed to determine which spare cards (non-utilized assets) should be prioritized for recovery. The business rules may leave some spare cards in place due to pending service order activity or other immediate needs. Other cards may be left in place if the reconciliation/recovery system knows that demand for that card is low and there is little chance of reuse elsewhere in the network. In some embodiments of the present invention. The system's priority for recovery are cards that are high priced and have a high demand so they will be reused quickly. These are the cards that may maximize capital savings.

In further embodiments of the present invention, the reconciliation/recovery system automatically interfaces with the RBOC's dispatching systems, where dispatch tickets (work orders) direct technicians to recover the prioritized circuit cards. This may enable the card to be quickly and effectively redeployed for maximum efficiency in the network.

By monitoring the network for spare or unused circuit cards and retrieving them for reuse, it may not be necessary to buy new circuit cards for each new change in the network. This monitoring process may provide immediate updates on available network resources while helping the RBOC respond to ever-changing customer demands.

As a whole, the capabilities of some embodiments of the present invention may help prevent RBOCs from overbuilding their networks, ultimately saving capital dollars. They may also significantly enhance customer service across the RBOC's area of operations.

In some embodiments of the present invention, multiple departments found in an RBOC may potentially benefit. Some embodiments of the present invention may synchronize databases with network inventory. Asset recovery may lay the groundwork for some embodiments of the present invention to address another challenge for service providers—aligning inventory control systems and equipment assignment databases with the physical and logical status of the equipment.

Currently, record discrepancies can diminish operational efficiencies. Because technician work instructions are generally based on inventory and assignment records, incorrect records can generate incorrect work instructions that could result in rework, delay customer service, or service interruptions. In addition, data discrepancy problems can grow, potentially impacting customer service, and create additional manual work for the network field team.

With some embodiments of the present invention, RBOCs may develop business rules to remotely access the network element information and assign data that accurately corresponds to the network inventory. This may reduce data discrepancies and manual intervention.

Some embodiments of the present invention may confront discrepancies. Such embodiments may synchronize network databases with the constantly changing inventories in the field using a "data alignment engine," a software application that may communicate efficiently and effectively with the inventory, billing, assignment, and/or dispatch systems while concurrently monitoring the network and its databases. The data alignment engine may allow disparate systems to interface, which may ultimately reduce equipment costs across the network.

With the help of the data alignment engine, some embodiments of the present invention may send inquiries to the SONET and DCS systems to determine the status of the circuits within and between each system. The data may be collected and compared to the inventory and assignment databases to determine whether the actual circuit working in the network is the same as the recorded design for the circuit. If it's not the same, business rules may be engaged to correct the inventory and assignment systems to reflect the true network, which may be the effective database of record.

The system may also report on circuits that are still in the network but are no longer in the inventory systems. These circuits typically represent unbilled services within the network. With this knowledge, a company's billing organization can submit billing on the services associated with the circuits or disconnect the circuits to allow network resources to be reassigned to new services, further avoiding capital costs.

With the newly synchronized data between the inventory systems and the network, a company may be able to reap the benefits of greater automated provisioning of customer services and reduce time spent by provisioning centers and network field organizations resolving discrepancies. Thus, some embodiments of the present invention may provide significant capital savings and operational efficiencies. The process improvement capabilities may offer new visibility into the network and its processes, enabling targeting for better results and solid returns. Correcting even small error rates has the potential to deliver major results. The ultimate goal is to grow a network as needed and save capital deployment dollars for the future.

For example, telephone companies across the country may not have to struggle with disconnected business processes, network overlap and unused inventory. Some embodiments of the present invention may improve staff productivity while recovering dollars for future investment. Comprehensive network analysis may prove a company's commitment to developing strategic business processes that can recover capital dollars needed to invest in a truly remarkable broadband network of the future.

Various particular embodiments of the present invention will now be further described with reference to the figures. FIG. 1 illustrates an exemplary embodiment of a computing device or data processing system 130 configured in accordance with embodiments of the present invention. The data processing system 130, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet protocol (IP) connection, and may thereby provide a means for communicating with a variety of different databases and network assets of a communications network. These components may be conventional components such as those used in many conventional data processing systems, which may be configured to operate as described herein.

Figure 2:
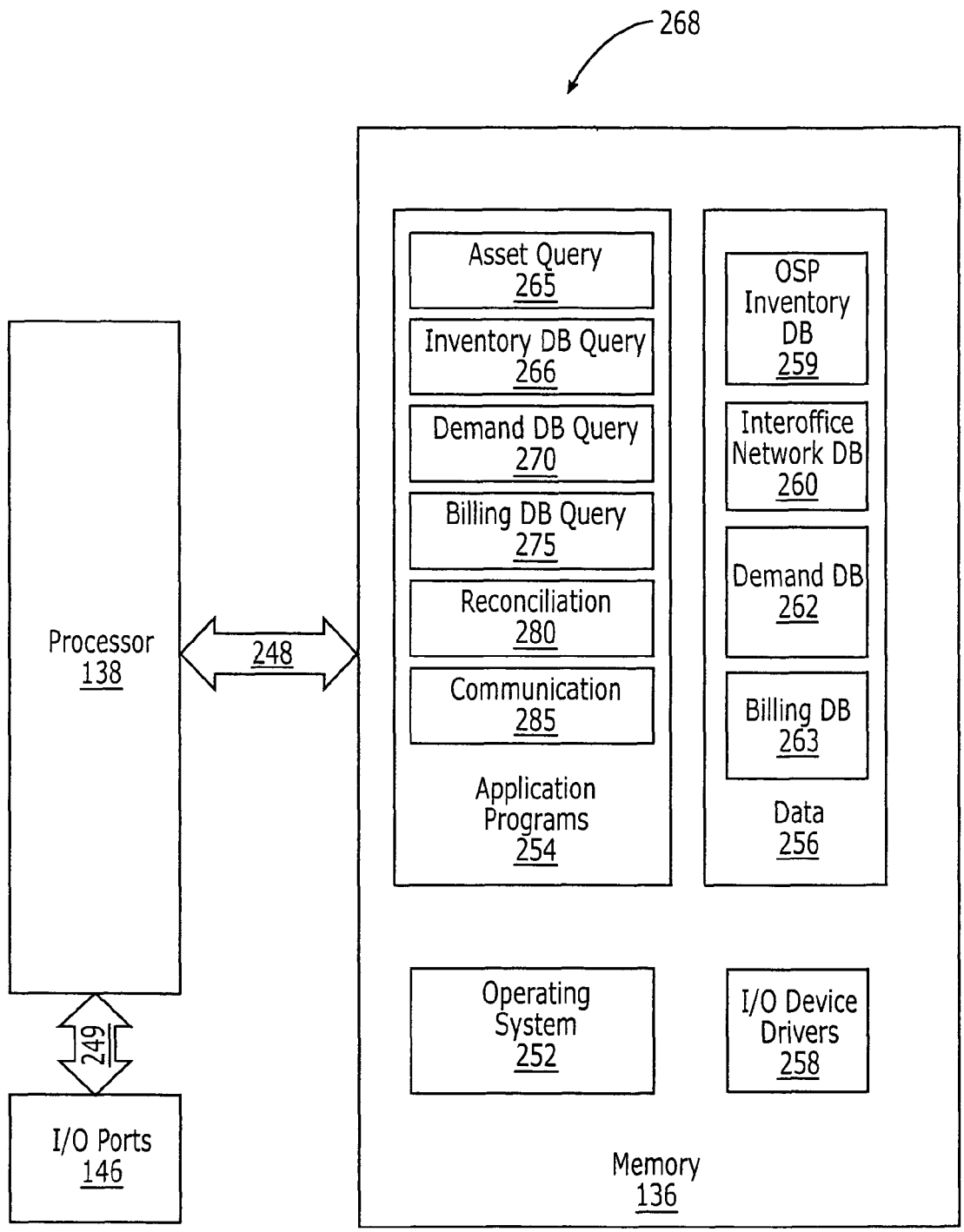
FIG. 2 is a block diagram illustrating a system for providing application services to a user according to some embodiments of the present invention.

Referring now to FIG. 2, a block diagram of a reconciliation/recovery system 268 for network asset management is provided that illustrates systems, methods, and computer program products in accordance with various embodiments of the present invention as will now be discussed. The processor 138 communicates with the memory 136 via an address/data bus 248. The processor 138 can be any commercially available or custom microprocessor, microcontroller, digital signal processor, enterprise, application, personal, pervasive and/or embedded processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As shown in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, WA, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the reconciliation/recovery system 268 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As further illustrated in FIG. 2, according to some embodiments of the present invention the application programs 254 may configured to provide a communications network asset recovery system including an asset query module 265 configured to query network assets on the communications network to obtain a current inventory of the assets on the communications network. The asset query module may be configured to obtain an identification of which of the assets on the communications network has a port in service and connected to other assets to support customer services supplied by the communications network. The asset query module 265 may also be configured to obtain a corresponding serial number for respective assets to allow tracking of the assets by their serial numbers. An inventory database query module 266 is configured to obtain inventory data for the communications network from an interoffice inventory management database (DB) 260, such as TIRKs. The inventory database query module 266 may also be configured to obtain inventory data from outside plant (OSP) inventory databases 259; such as LFACS and/or LEIM.

In some embodiments of the present invention, the application programs 254 may also include a demand database query module 270 configured to obtain asset type need data from a demand database 262, such as XELUS. In addition, a billing database query module 275 may be provided that is configured to obtain billing information associated with the communications network that identifies valid services from a billing database 263, such as CRIS/CABS.

As also shown in FIG. 2, the system 268 may include a reconciliation module 280 configured to compare the current inventory with the inventory data from the inventory management database to identify a plurality of non-utilized assets. The reconciliation module may also be configured to identify at least one of the non-utilized assets for recovery, for example, based on obtained asset type need data from the demand database 262. The reconciliation module may further be configured to reconcile the OSP inventory database 259 and/or the interoffice network database 260 with obtained current inventory information from the asset query module 265. In other embodiments of the present invention, the reconciliation module may be configured to automatically generate work orders requesting recovery of stranded assets. A communication module 285 may provided to communicate the generated work orders to a work force control system, for example, using the I/O device drivers 258 and/or the I/O data ports 146.

While the present invention is illustrated with reference to the various modules 265, 266, 270, 275, 280, 285 being application programs in FIG. 2, as will be appreciated by those of skill in the art, other configurations fall within the scope of the present invention. For example, rather than being an application program, the communication module 285 may also be incorporated into the operating system 252 or other such logical division of the data processing system 130. Furthermore, while the various application programs 254 are illustrated in a single data processing system, as will be appreciated by those of skill in the art, such functionality may be distributed across one or more data processing systems. For example, the databases 259, 260, 262, 263 may be resident on a distinct device from the application programs 254, and various modules of the application programs 254 may be resident on different devices, and distinct instantiations of the same modules may be resident on different devices. Thus, the present invention should not be construed as limited to the configuration illustrated in FIGS. 1 through 2, but may be provided by other arrangements and/or divisions of function between data processing systems. In fact, as will be clear from the description herein, the functionalities of the present invention will typically be distributed across a network of communicatively coupled computing devices and may utilize a variety of input/output devices to support a variety of network asset management services, such as asset recovery, inventory reconciliation, asset revenue recovery and updating of network assets.

Figure 3:
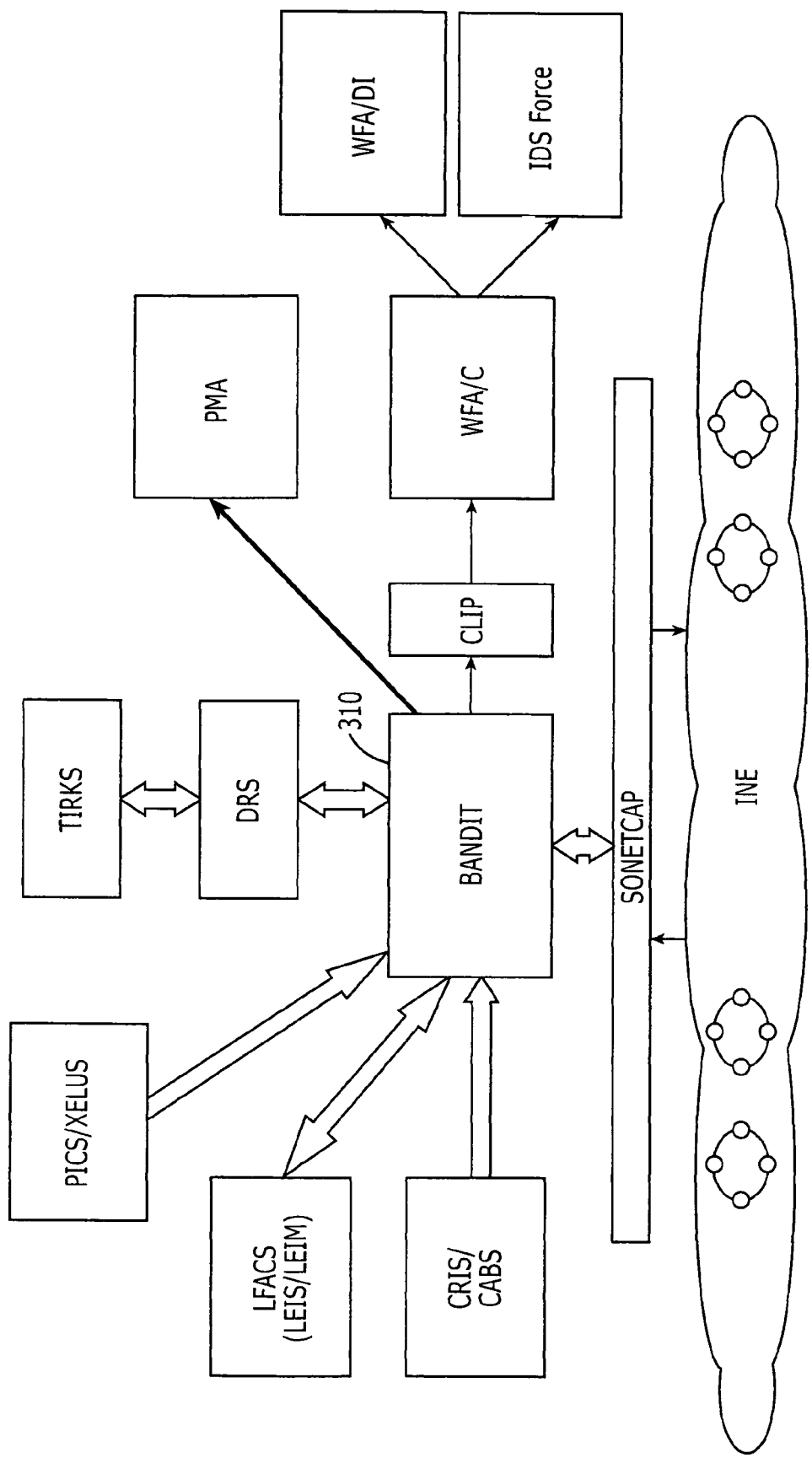
FIG. 3 is a block diagram illustrating an architecture of a system for managing network assets according to some embodiments of the present invention.
Figure 4:
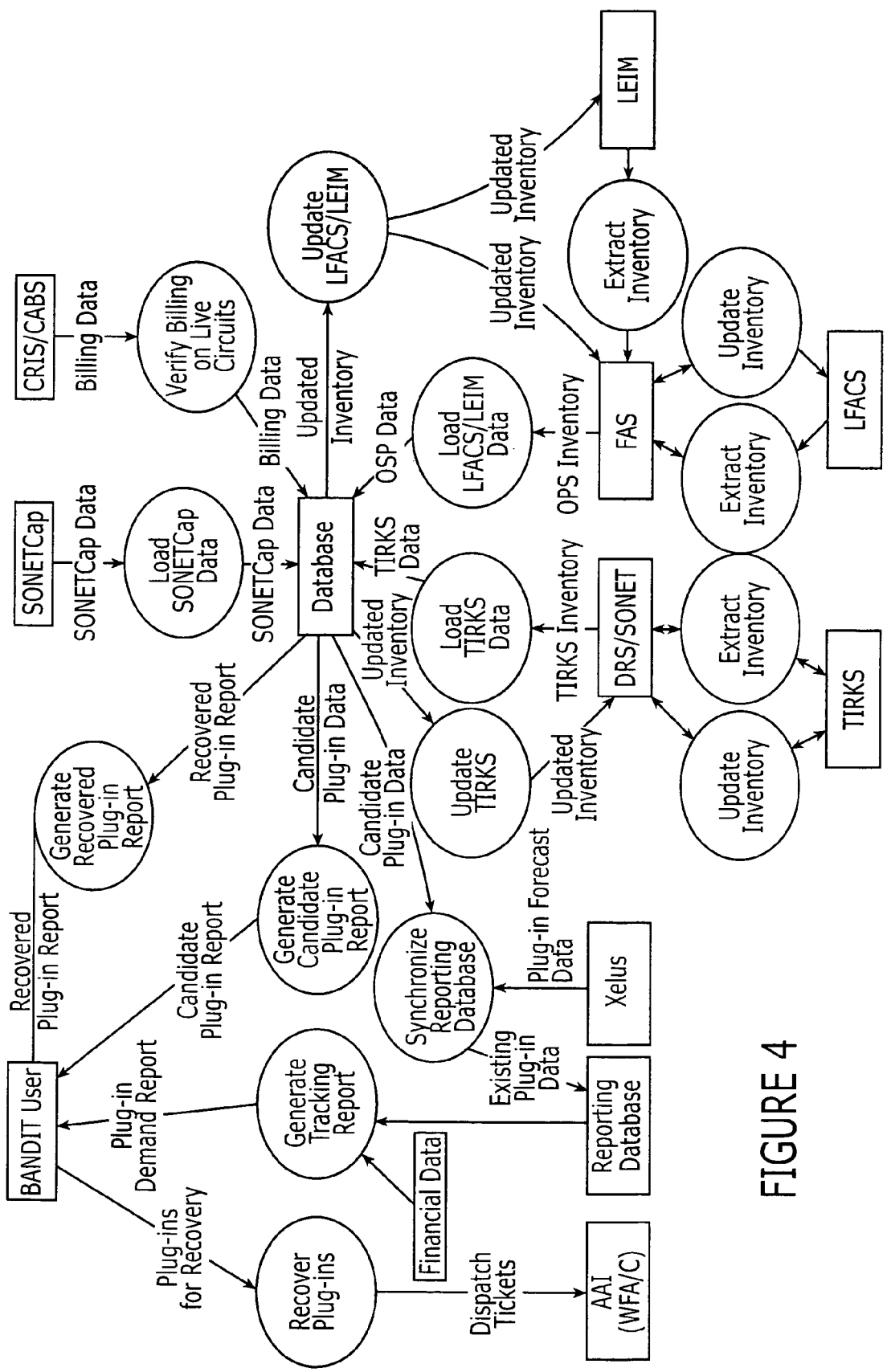
FIG. 4 is a block diagram illustrating data flows in a system for managing network assets according to some embodiments of the present invention.

A block diagram illustrating an architectural overview of a system according to some embodiments of the present invention is provided in FIG. 3. Various acronyms will be used herein in describing embodiments of the present invention with reference to particular implements in cooperation with systems of BellSouth Corporation, the meaning of which acronyms is provided in Table 1.

TABLE 1

| Acronym | Description |
| --- | --- |
| AAI | Advanced Application Interface |
| AQ | Advanced Queuing |
| BANDIT | BellSouth Application for Network Data Inventory Transformation |
| CABS | Carrier Access Billing System |
| CBS | Common Business Service |
| CLIP | Common Legacy Interface Provider |
| CLLI | Common Language Location Identifier |
| CSV | Character Seperated Values |
| DRS | Disaster Recovery System (CBM vendor software) |
| FAB | Field Assistance Bureau |
| FAS | Facility Availability System |
| GUI | Graphical User Interface |
| HECI7 | First 7 characters of HECIG |
| HECIG | Human Equipment Common Identifier Group |
| IDS FORCE | Integrated Dispatch System |
| LEIM | Loop Electronics Inventory Module |
| LFACS | Loop Facility Assignment and Control System |
| MechEIU | Mechanized Equipment Inventory Update |
| MMU | Metadata Maintenance Utility |
| NE | Network Element, also referred to an node or as device |
| NRC | Network Reliability Center |
| PICS | Plug-in Control System |
| RM | Cramer ResourceManager |
| SCID | SONET Circuit Identifier |
| SE | Cramer SyncEngine |
| SONET | Synchronous Optical Network |
| SONETCAP | SONET Capacity Activation Program |
| TBD | To Be Determined |
| TID | Network Element Target Identifier |
| TIRKS | Trunk Integrated Record Keeping System |
| UDM | Unified Data Model (CRAMER XML data format) |
| UPK | Unique Persistent Key |
| WFA/C | Work Force Administration and Control System |
| WFA/DI | Work Force Administration and Control System Dispatch-In |
| XELUS | XELUS Corp. |

The reconciliation/recovery system 310 of FIG. 3 may include various system components, including: a database to store INE inventory data and synchronization data; a batch interface to SONETCAP to extract data from the active (in-service) INE; a batch interface to CBM to pull TIRKS inventory data for the selected INE; a batch interface to CBM to update TIRKS inventory data via, for example, a FAB ticketing process and/or via an automated process; an adapter (for example, one per device type) to parse, extract, and/or transform SONETCAP data into another format for reconciliation and analysis purposes; an adapter (for example, one per device type) to parse, extract, and transform TIRKS data into the format for reconciliation and analysis purposes; a batch interface to LEAD/LEIM to pull outside plant inventory data on selected INE; a batch interface to LEIM to update selected INE data; a batch interface to LFACS to pull inventory and assignment data for the selected INE; a batch interface to LFACS to update inventory and assignment data for the selected INE; a batch interface to PICS to retrieve reused candidate plugs data; a batch interface to XELUS to retrieve forecast and demand information about asset (card) types identified by HECI7 for plug recovery; a real-time request/response interface to AAI or CLIP to create and status WFA tickets to support card recovery in Central Office (CO) and Customer Premise (CP) sites; a real-time request/response interface to the Proactive Maintenance Analysis (PMA) system to support plug-in recovery at Remote Terminal (RT) sites; a real-time request/response query interface to a billing database (CRIS/CABS) for verifying if the live circuits are being billed; and a reporting interface to support candidate card identification, retrieval, and tracking.

The reconciliation/recovery system 310 will be referred to for this example as BANDIT. The associated synchronizing central database in BANDIT may be configured to store the INE data (physical and logical) and the synchronization data created by comparing (and resolving the differences where appropriate) the network element data obtained by querying the assets with the data received from the inventory management system databases. This central database may provide the data needed for generating various reports. Various interfaces to BANDIT, shown by arrows in FIG. 3, will now be described for some embodiments of the present invention.

The SONETCAP interface may provide SONET network element and digital cross connects (or other port in service related) data gathered from the INE by the SONETCAP system. The CBM interface may provide TIRKS inventory data on the INE in response to a request for such data originating from BANDIT. The LFACS/LEIM interface may provide LFACS and LEIM outside plant inventory data on INE. This may provide BANDIT the ability to update outside plant INE inventory in LFACS. The billing interface may be an existing CBS or CBS like interface to CABS or other such standard or custom interface to the billing information database(s). BANDIT may use this interface to check billing status on candidate live circuits, i.e., services, associated with assets on the communications network. The WFA/C interface (AAI or CLIP) may provide BANDIT the ability to create WFA tickets and obtain/update status on those tickets via WFA/C. WFA/C may interface with either IDS FORCE or WFA/DI as necessary in the illustrated embodiments of FIG. 3. The XELUS interface is configured to interact with the BellSouth XELUS system for forecasting the need (demand) for plug-ins (assets). This interface may provide a prioritized list of asset/card types identified by HECI7 that are priority candidates for recovery by BANDIT. The SONET Plug-in Configuration System (PICS) is a master database for plug-in assets. This system is a sister of the supply chain management system for plug-ins. A PICS interface may be provided as well for BANDIT in some embodiments.

Various processes may be supported by BANDIT in different embodiments of the present invention. INE data may be loaded from SONETCAP; TIRKS data may be loaded; LFACS data may be loaded; and LEIM data may be loaded. LFACS, TIRKS and/or LEIM data may be updated/reconciled based on SONETCAP INE data. Billing may be verified. Recoverable asset types may be identified from XELUS and assets may be identified for recovery. Tickets (work orders) to WFA/C and/or PMA may be generated to recover assets. Asset recovery may be monitored/tracked. Reporting databases may be synchronized. Various reports may be generated, such as candidate asset, recovered asset and asset type demand reports.

To load SONETCAP data, BANDIT may submit a request to SONETCAP for a specific geographical area and device type. The geographical area and device type may be determined using a "Generate Plug-in Demand Report" process. Using appropriate TL1 commands, SONETCAP may retrieve device information, a list of the cards (assets) on the device (including their activity and service status) and/or a list of the logical cross connects on the device to the asset. The SONETCAP data may be returned in an ASCII flat file format. For practical reasons, the data from a region may be broken into a number of files. The flat files may be moved to an adapter server before processing commences. The presentation of TL1 output data from SONETCAP generally differs from manufacturer to manufacturer and also from device type to device type.

In some embodiments of the present invention, the SONETCap data is processed by one or more device-specific adapters. An adapter may parse and transform the data into a standard format for the central database. In addition to the standard format file from SONETCAP, the adapter may produce a TIRKS input file to be used by CBM system to extract TIRKS inventory information for the network elements listed in this file. The TIRKS data may then moved to a SyncEngine server of BANDIT that may be invoked by the user via a graphical user interface (GUI). The TIRKS data may be loaded and compared to the SONETCAP current inventory. All differences may be identified and, where appropriate, automatically resolved. Devices, assets (cards), and associated attributes may be tracked in the synchronization database using a defined data model.

In some embodiments of the present invention, a "Load TIRKS data" process is provided to determine if the cards identified by SONETCap are in a "pending" or "in service state" as reported by TIRKS. An artifact of the "Load SONETCAP data" process may be a TIRKS input file that may serve as a request to the CBM system. The TIRKS input file may specify a network portion, such as a SONET ring carrier identifier, to obtain TIRKS data encompassing information beyond assets found as in the current inventory by SONETCAP. The CBM system may extract TIRKS inventory data from TIRKS system for the devices identified in the input file. The extracted data from TIRKS may be transferred to the adapter server in an ASCII flat file format. The TIRKS data file may be processed by the TIRKS adapter.

BANDIT may have a single adapter for TIRKS data. This adapter may parse and transform the TIRKS data into a synchronization format. The adapter may contain global transformation rules and configurable transformation rules that are based on the device type being processed. This TIRKS data may be moved to the SyncEngine server, which may then be invoked by the user via the GUI and the TIRKS data may be loaded and compared to the current inventory from SONETCAP. Differences may be identified and, where appropriate, automatically resolved. In some embodiments of the present invention, SONETCAP is designated the trusted data source for physical inventory and no devices or cards are created during the TIRKS load.

The "Load LFACS/LEIM data" process may be invoked to determine if the cards identified by SONETCap are in a "pending" or "in service state" as reported by LFACS or LEIM. The "Update LFACS/LEIM" process may be used to update outside plant inventory information in LFACS and LEIM once the candidate assets have been recovered by BANDIT. Additionally the "Update LFACS/LEIM" process may be used to automatically correct LFACS and LEIM inventory where this inventory does not match the INE data retrieved by SONETCAP. Items that may be corrected include cross-connects, circuit ids, plug-in status and the like.

The "Update TIRKS" process may be used to update TIRKS inventory once the candidate assets have been recovered. This may be achieved through FAB ticketing via the CBM interface. Additionally the "Update TIRKS" process may be used to automatically correct TIRKS inventory where this inventory does not match the INE data retrieved by SONETCAP. Items that may be corrected include cross-connects, circuit ids, plug-in status and the like.

Further details of embodiments of the present invention with BANDIT implemented in a BellSouth system will now be described. For billing verification, in this example, BANDIT may utilize a CBS or CBS like service to check a CABS system to determine the billing status of live circuits (services) that are identified by BANDIT. For identification of candidate assets for recovery, BANDIT may interface with XELUS to get a listing of asset (plug-in) types for which there is a forecasted need and preferentially attempt to recover plug-ins for which XELUS has identified a need. For this example, using the INE data retrieved by SONETCAP, BANDIT determines where recoverable plug-ins exist in the INE that do not have cross-connects or where the cross-connects are incomplete. The listing of candidate plug-ins is then verified to not have in-service or pending service assignments in TIRKS, LFACS, or LEIM. Candidate plug-ins determined to not have an assignment conflict are placed on the candidate report for recovery. It will be understood that, while an INE corresponds to an asset as described herein, a particular INE may have a variety of separately identifiable plug-ins that, as they may be individually tracked and queried, are also considered assets as used herein.

For this particular example BellSouth system implementation, BANDIT also determines whether a candidate plug-in is located in a central office (CO) or a remote terminal (RT) and interfaces with WFA/C for CO and interoffice network located plug-ins and with PMA for plug-ins located in outside plant (OSP) remote terminals in order to create a work ticket for a technician to recover the plug-in.

BANDIT may also be utilized to develop a dedicated reporting database and synchronizing the data from various data sources, such as PICS, XELUS, and other company specific data bases. The synchronize reporting database process may merge the data from various sources and populate the reporting database. Reports may also be generated, such as a candidate plug-in report containing, for example, state, turf district, SCID, RT address, wire center, NE type, TID, U_TID (CLLI+Floor+Relay Rack), shelf, slot position, card type, HECI7, and card creation timestamp for each candidate card. This report may be accessible via a WEB GUI. Similarly, a recovered plug-in report may contain state, turf district, SCID, RT address, wire center, NE type, TID, U_TID (CLLI+Floor+Relay Rack) , shelf, slot position, card type, HECI7, and card creation timestamp for each candidate card recovered. This report may also be accessible via a WEB GUI.

Figure 5:
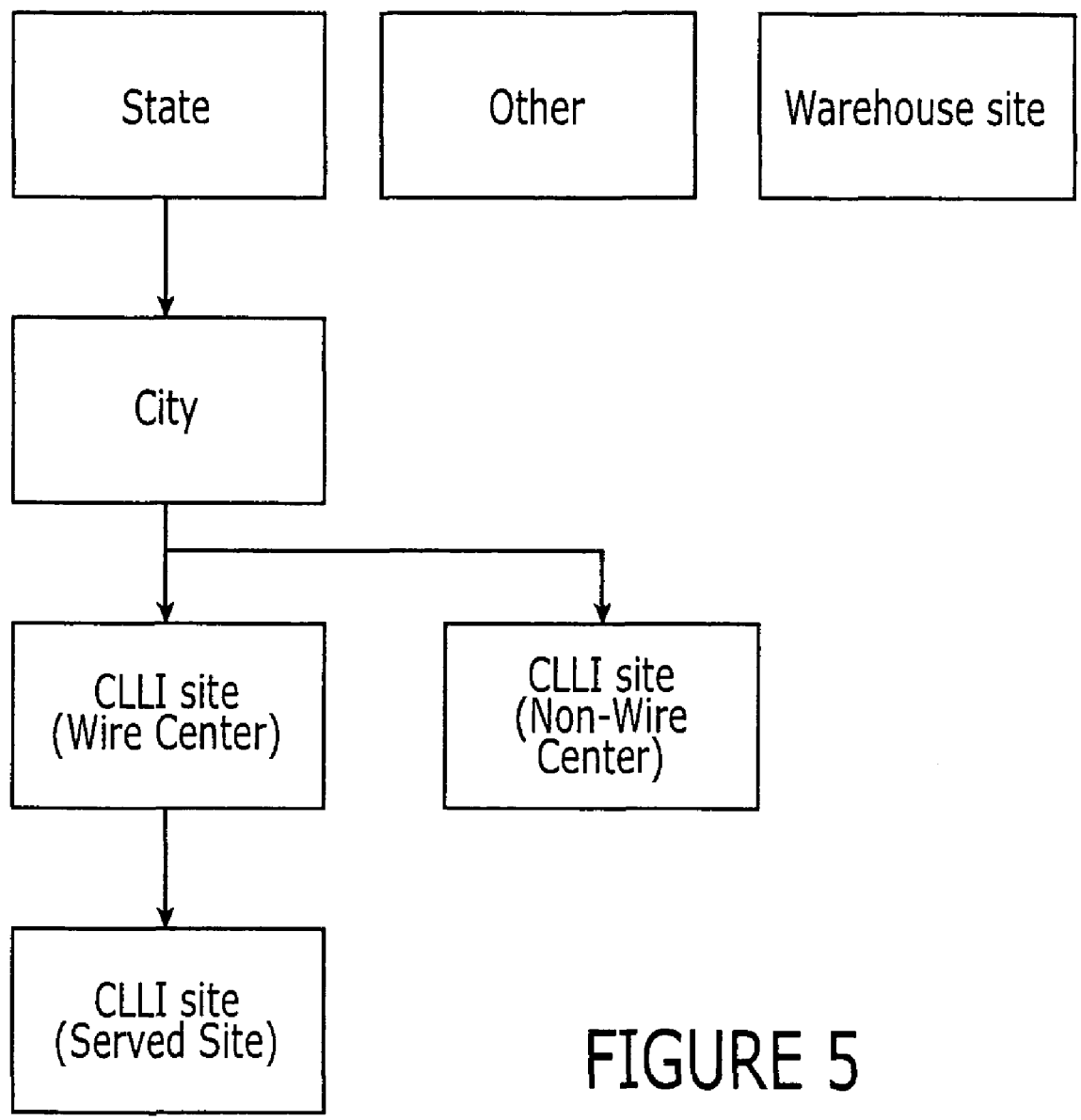
FIG. 5 is a block diagram illustrating a location hierarchy for describing a telecommunications network according to some embodiments of the present invention.

Assets may be tracked by reference to a device. A device, as used herein, represents physical telecommunications equipment used to transmit data over physical links. Devices are sometimes referred to as nodes. Examples of devices include FT2000 and FLM2400. As used herein, cards, or plug-ins, refers to removable device components. They generally contain ports used to terminate physical links. Locations, as used herein, may contain devices and cards. Every uploaded (queried) device may be placed in a location of "CLLI site" type. CLLI sites are generally 8-or 11-character locations. Locations may be data-loaded into a central database and refreshed periodically. If a location is not found or not recognized when a device is uploaded then, the device may be placed in a location named "Unknown Location." The location type "Other" may be used to support the "Unknown Location." The locations may be organized hierarchically. FIG. 5 depicts an example of a location hierarchy.

Figure 6:
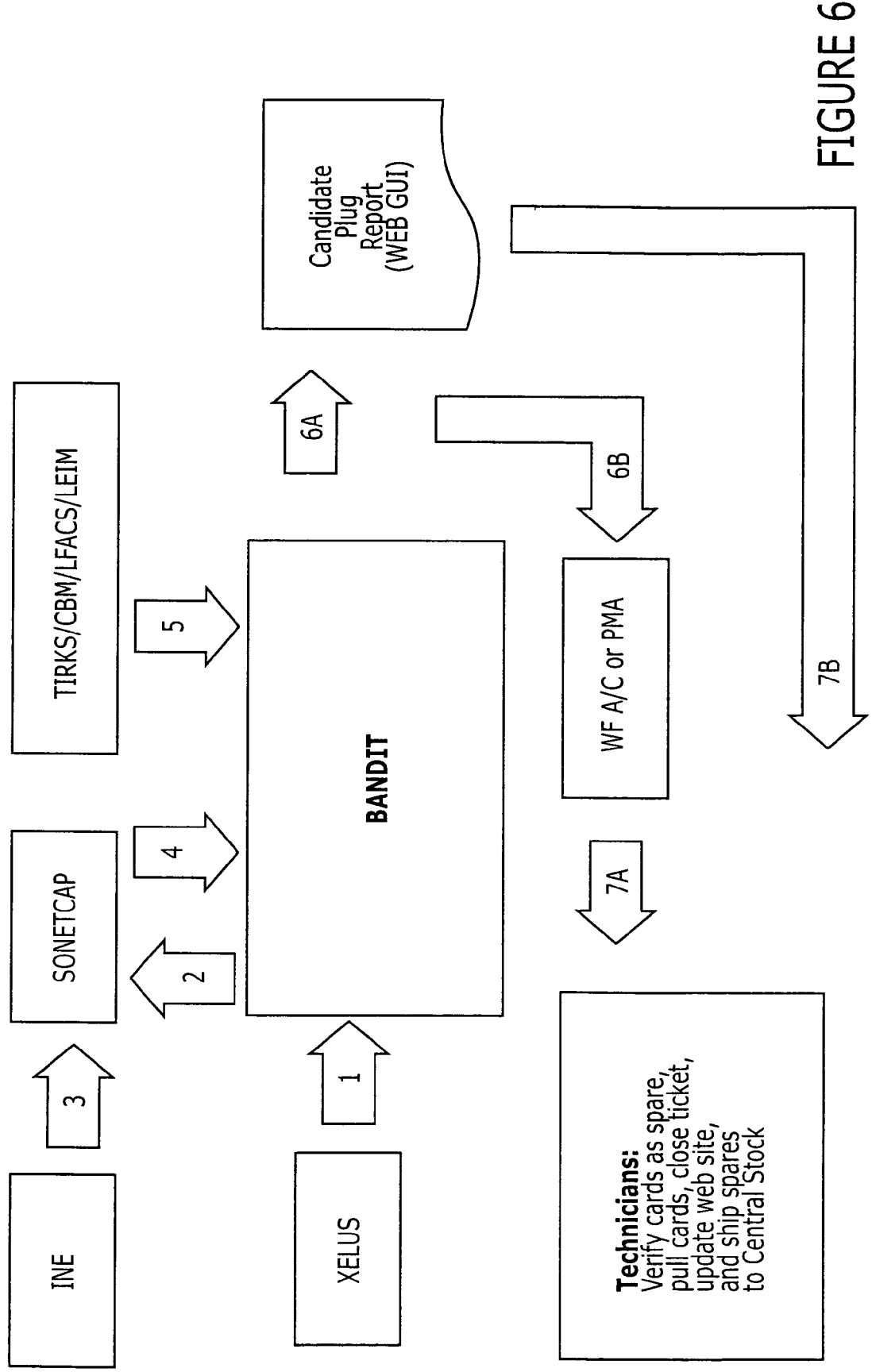
FIG. 6 is a block diagram illustrating asset recovery work flows according to some embodiments of the present invention.

An asset recovery work flow block diagram according to some embodiments of the present invention is provided in FIG. 6. Work flow operations for the embodiments of FIG. 6 will now be described with the reference numbers in FIG. 6 corresponding to the sequence numbering below:

1) The asset recovery system (BANDIT in FIG. 5) interfaces to a demand data base (XELUS in FIG. 5) to get INE plug-in types needed by a user.

2) BANDIT provides plug-in types to an asset query module (SONETCap in FIG. 5).

3) SONETCap uses plug-in types provided by BANDIT to poll INE devices for existing plug-ins without cross-connects or with incomplete cross-connects.

4) SONETCap provides candidate plug-in data back to BANDIT.

5) BANDIT queries inventory systems for "in-service" or "pending service" assignments on candidate plug-ins.

6) BANDIT (A) sends final candidate listing to a maintenance database (WEB GUI in FIG. 5) and (B) issues ticket in a related maintenance database system (WFA/C or PMA in FIG. 5) to have technician recover plug-in.

7) Technician receives ticket, verifies that plug-in is actually spare, pulls plug-in from device, returns plug-in to central stock, closes ticket, and updates the user interface (WEB GUI in FIG. 5).

Figure 7:
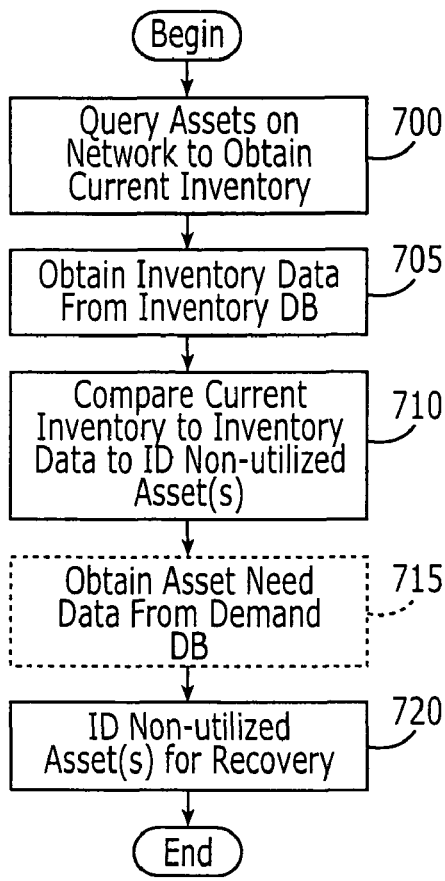
FIGS. 7-13 are flowcharts illustrating operations for asset management according to various embodiments of the present invention.

Operations according to various embodiments of the present invention will now be further described with reference to the flow chart illustrations of FIGS. 7 through 13. Referring first to FIG. 7, operations for network asset recovery begin by querying assets on a communications network to obtain a current inventory of the assets on the communications network, for example, by SONETCAP (Block 700). In some embodiments of the present invention, querying assets on the communications network includes obtaining an identification of which of the assets on the communications network has a port in service. Inventory data is also obtained for the communications network from an inventory management database(s), such as TIRKS (Block 705). The current inventory is compared with the inventory data from the inventory management database(s) to identify a plurality of non-utilized assets (Block 710).

As shown at Block 715, in some embodiments of the present invention, asset type need data is also obtained from a demand database. At least one of the non-utilized assets is identified for recovery (Block 720). Asset need data may be obtained, for example, from a database such as XELUS.

Further embodiments of the present invention for network asset recovery will now be described with reference to the flow chart illustration of FIG. 8. As shown for the embodiments of FIG. 8, operations begin by querying assets on a communications network to obtain a current inventory of the assets on the communications network. The assets may be intelligent network elements (INEs) and the communications network may be a telecommunications network. Querying the assets may include determining which of the assets are currently utilized, for example, by determining which of the assets has a port in service based, for example, on cross-connect information. Inventory data is obtained from an inventory management database(s), such as TIRKS (Block 805). The current inventory is compared to inventory data from the inventory management database(s) to identify a plurality of non-utilized assets on the communications network (Block 810).

Figure 8:
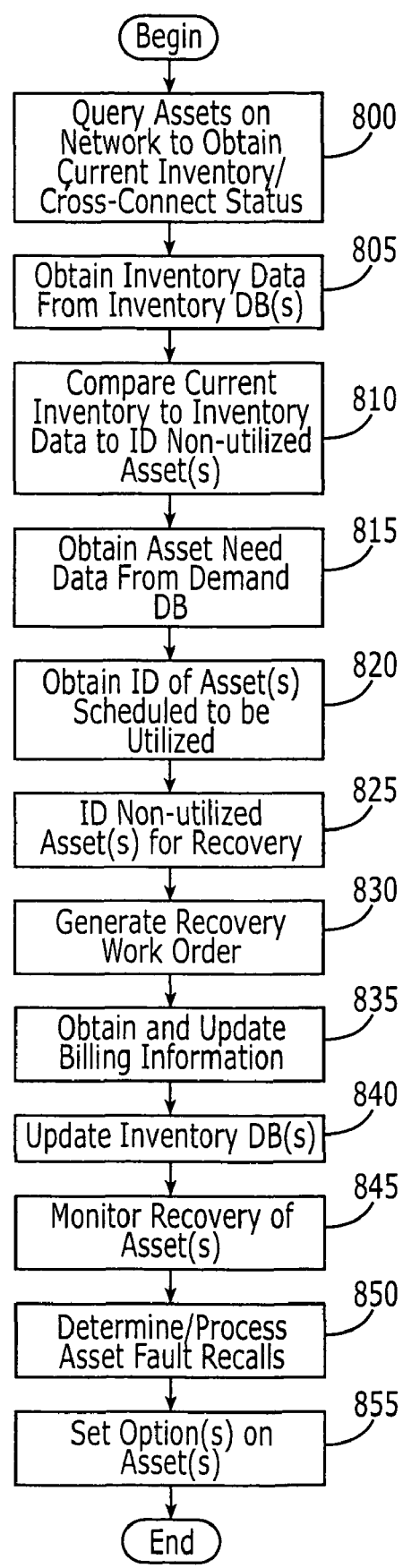

For the embodiments illustrated in FIG. 8, an identification of ones of the assets scheduled to be utilized may also be obtained (Block 820). Asset type need data is obtained from a demand database, such as XELUS (Block 815). For some embodiments, operations in comparing current inventory with inventory data to identify non-utilized asset(s) at Block 810 may include identifying assets that are not currently utilized as non-used assets only if they are not scheduled to be utilized. At least one of the non-utilized assets is identified for recovery, with an order of recovery that may be prioritized based on the obtained asset type need data from Block 815 (Block 825).

Some embodiments of the present invention as illustrated in FIG. 8, may also include operations for automatically communicating with a workforce control system, such as WFA/C or PMA, to initiate recovery of identified assets as will now be described. A work order requesting recovery of one or more of the non-utilized assets is automatically generated (Block 830). Other details related to particular embodiments of generating a work order will be described with reference to FIG. 11 below.

Some embodiments of the present invention, as illustrated in FIG. 8, also provide for obtaining and updating billing information related to services supported by the assets queried at Block 800 (Block 835). Details of operation at Block 835 for particular embodiments of the present invention will be described with reference to FIG. 9 below.

The inventory management database may be updated based on the current inventory (Block 840). It will be understood that operations at Block 840 related to reconciling a database of inventory to the current inventory may be directed to a plurality of different maintained inventory databases. For example, the inventory management database may an interoffice network database, such as TIRKS. The inventory management database may also be a plurality of inventory management databases including an interoffice network database and an outside plant database(s). Furthermore, the outside plant database(s) may include a database of assets on an outside plant portion of a communications network, such as an LEIM database and the customer assignment database associating particular customers with an asset on the outside plant portion of the communications network, such as an LFACS database.

Recovery of the non-utilized asset(s) may be monitored (Block 845). For example, recovery may be monitored by querying the non-utilized asset(s) to determine if they remain on the communications network, for example, at a determined time after identifying the non-utilized asset(s) for recovery. In other embodiments of the present invention as illustrated in FIG. 8, operations may include identifying assets by a serial number for serial number of assets subject to recall and automatically processing a recall on such assets (Block 850). Operations related to such a recall operation will be further described with reference to FIG. 13 below. In addition, some of the embodiments, as illustrated in FIG. 8, may automatically set option(s) on asset(s) coupled to the communication network (Block 855) as will be further described with reference to FIG. 12 below.

Figure 9:
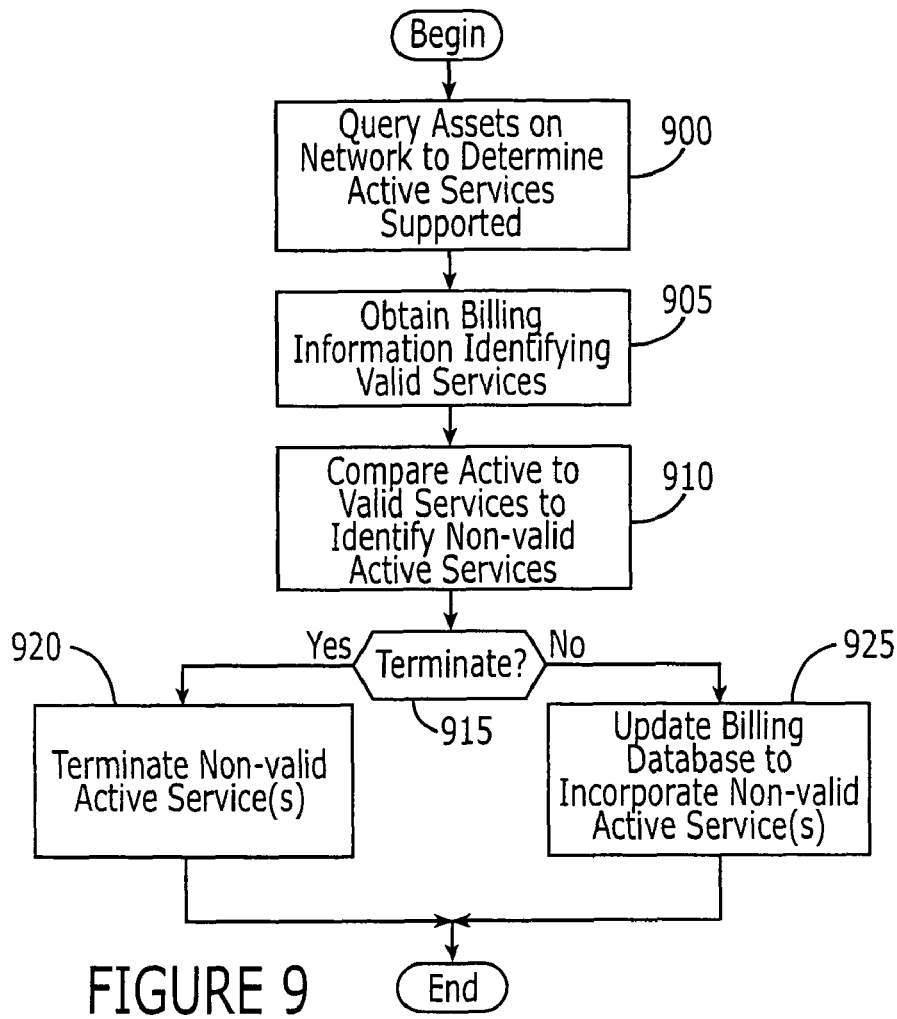

Operations for network asset revenue recovery according to some embodiments of the present invention will now be described with reference to the flow chart illustration of FIG. 9. As shown in FIG. 9, operations begin at Block 900 by querying assets on a communications network to determine active services supported by the assets. Billing information associated with the communications network that identifies valid services on a network is obtained from a billing database, such as CAB (Block 905). The identified valid services and the determined active services are compared to identify active services not corresponding to a valid service (Block 910). If a provider chooses to terminate such non-valid active services (Block 915), the active services not corresponding to a valid service are terminated (Block 920). For example, a work order requesting such termination could be generated. If the provider chooses not to terminate the service (Block 915), the billing database is updated to incorporate the active service not corresponding to a valid service into the billing database to allow billing for the service (Block 925).

Figure 10:
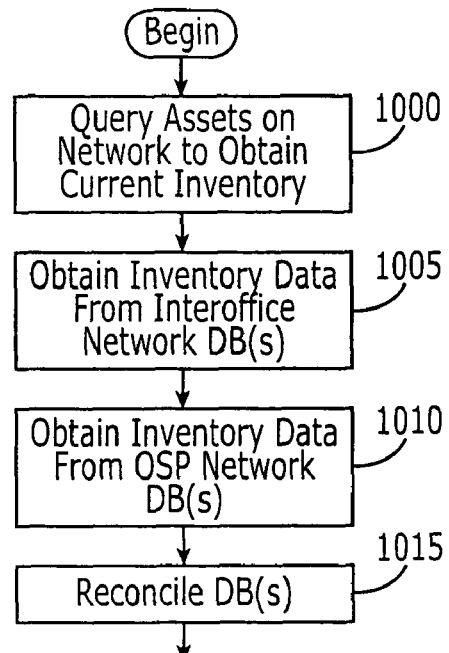

Operations for network asset inventory reconciliation according to various embodiments of the present invention will now be described with reference to the flow chart illustration of FIG. 10. Operations for the embodiments of FIG. 10 begin at Block 1000 by querying assets on the communications network to obtain a current inventory of the assets on the communications network. Inventory data for the communications network is obtained from an interoffice network database, such as TRKS (Block 1005). Inventory data for the communications network is also obtained from an outside plant (OSP) database, such as LFACS and/or LEIM (Block 1010). The inventory data from the interoffice network database and/or the outside plant database(s) is reconciled to the current inventory acquired from querying the actual assets (Block 1015).

Figure 11:
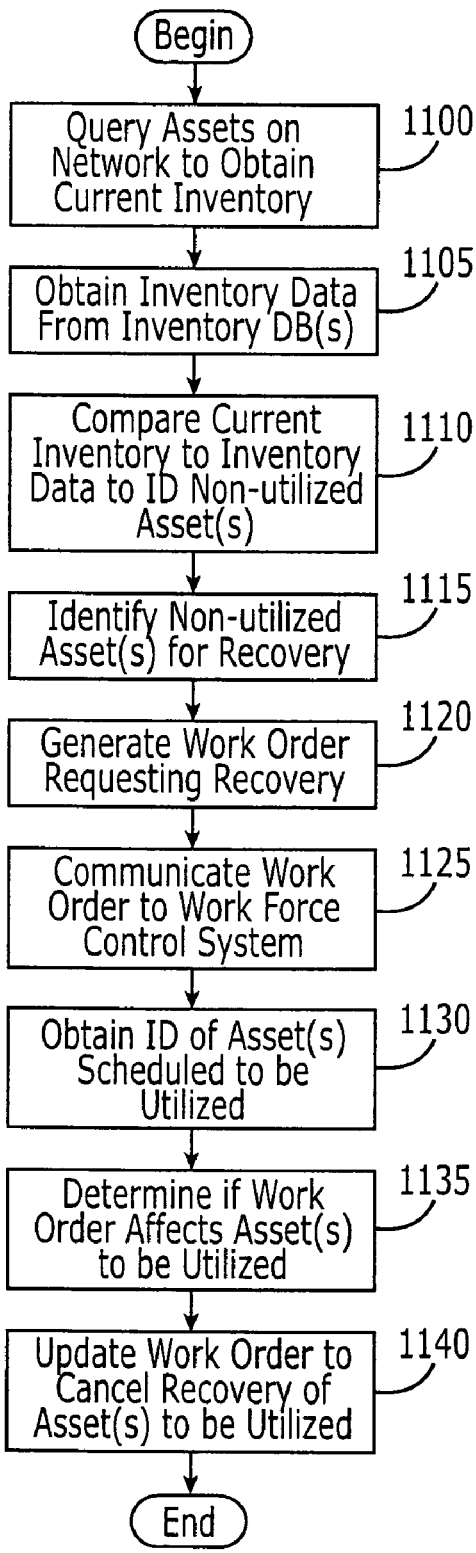

Operations for network asset recovery according to further embodiments of the present invention will now be described with reference to the flow chart illustration of FIG. 11. For the embodiments illustrated in FIG. 11, operations begin at Block 1100 by querying assets on a communication network to obtain a current inventory of the assets on the communications network. Inventory data for the communications network is also obtained from a inventory management database(s) (Block 1105). The current inventory is compared with the inventory data from the inventory management database(s) (Block 1110) to identify a plurality of non-utilized assets (Block 1115). At least one of the non-utilized assets is identified for recovery (Block 1115).

A work order requesting recovery of the non-utilized asset(s) is automatically generated (Block 1120). The generated work order is communicated to a work force control system, such as WFA/C or PMA (Block 1125). As also shown in the illustrated embodiments of FIG. 11, an identification of ones of the assets scheduled to be utilized may be obtained (Block 1130). It is determined if the work order requesting recovery of the non-utilized asset(s) request recovery of one of the assets scheduled to be utilized (Block 1135). If so, the work order is updated to cancel requesting recovery of assets scheduled to be utilized (Block 1140).

Figure 12:
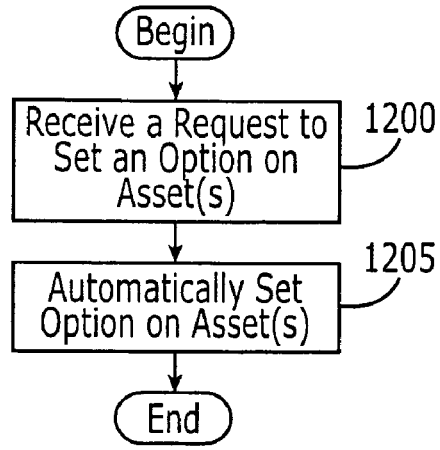

Operations for updating intelligent network elements (INEs) on a telecommunications network according to some embodiments of the present invention will now be described with reference to the flow chart illustration of FIG. 12. A request to set an option of a plurality of the assets on the communications network is received (Block 1200). Such a request, for example, may be a non-service specific request establishing a general preferred configuration for a particular category of an INE on a telecommunications network. The assets are automatically queried to set the option responsive to the received request from Block 1200 (Block 1205).

Figure 13:
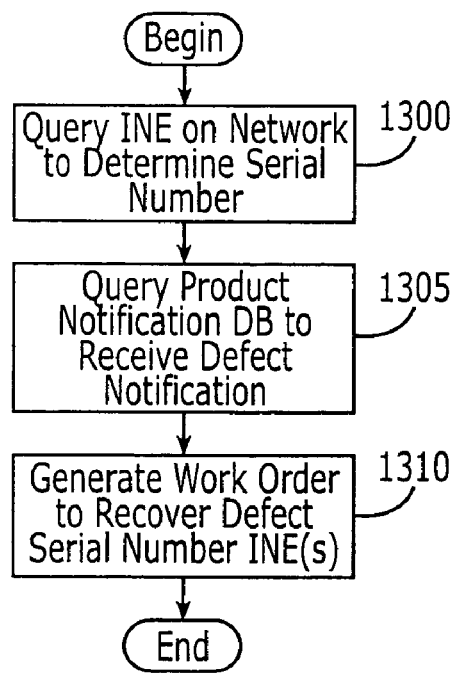

Operations for recovery of intelligent network elements on a telecommunications network will now be described for some embodiments of the present invention with reference to the flow chart of FIG. 13. The intelligent network elements are queried to determine a serial number associated with the intelligent network elements (Block 1300). A product notification database is queried to receive a notification by serial number of intelligent network element(s) having a defect (Block 1305). A work order is automatically generated requesting recovery of network intelligent element(s) having a defect responsive to the notification from Block 1305 (Block 1310).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method for network asset recovery comprising:
    querying assets on a communications network to obtain a current inventory of the assets on the communications network;
    obtaining inventory data for the communications network from an inventory management database;
    comparing the current inventory with the inventory data from the inventory management database to identify a plurality of non-utilized assets;
    obtaining asset type need data from a demand database, wherein asset type need data comprises data for forecasting a need for assets; and
    identifying at least one of the non-utilized assets for recovery based on the obtained asset type need data.

2. The method of claim 1 wherein the assets comprise intelligent network elements and wherein the communications network comprises a telecommunications network.

3. The method of claim 2 wherein querying assets comprises determining which of the assets are currently utilized.

4. The method of claim 3 wherein determining which of the assets are currently utilized comprises determining which of the assets has a port in service.

5. The method of claim 3 wherein the method further comprises obtaining an identification of ones of the assets scheduled to be utilized and wherein comparing the current inventory with the inventory data from the inventory management database further comprises identifying assets that are not currently utilized as non-utilized assets only if they are not scheduled to be utilized.

6. The method of claim 1 further comprising:
    automatically generating a work order requesting recovery of the at least one of the non-utilized assets; and
    communicating the generated work order to a work force control system.

7. The method of claim 6 further comprising:
    obtaining an identification of ones of the assets scheduled to be utilized;

determining if the work order requesting recovery of the at least one of the non-utilized assets requests recovery of one of the assets scheduled to be utilized; and updating the work order to cancel requesting recovery of the one of the assets scheduled to be utilized if the work order requests recovery of the one of the assets scheduled to be utilized.

8. The method of claim 2 wherein querying assets on the communications network comprises determining active services supported by the assets and wherein the method further comprises:

obtaining billing information associated with the communications network that identifies valid services from a billing database; and comparing the identified valid services and the determined active services to identify active services not corresponding to a valid service.

9. The method of claim 8 further comprising:

terminating an active service not corresponding to a valid service; or updating the billing database to incorporate an active service not corresponding to a valid service.

10. The method of claim 2, further comprising updating the inventory management database based on the current inventory.

11. The method of claim 10 wherein the inventory management database comprises an interoffice network database.

12. The method of claim 10 wherein the inventory management database comprises a plurality of inventory management databases including an interoffice network database and an outside plant database and wherein updating the inventory management database comprises updating each of the inventory management databases based on the current inventory.

13. The method of claim 12 wherein the outside plant database comprises a database of assets on an outside plant portion of the communications network and a customer assignment database associating particular customers with an asset on the outside plant portion of the communications network.

14. The method of claim 2 wherein identifying at least one of the non-utilized assets for recovery is followed by monitoring recovery of the at least one of the non-utilized assets by querying the at least one of the non-utilized assets to determine if it remains on the communications network at a determined time after identifying the at least one of the non-utilized assets for recovery.

15. The method of claim 2, wherein querying assets comprises determining a serial number associated with the assets and wherein the method further comprises:

querying a product notification database to receive a notification of a serial number of an asset having a defect; and automatically generating a work order requesting recovery of the asset having a defect responsive to the notification.

16. The method of claim 2 further comprising:

receiving a request to set an option of a plurality of the assets on the communications network; and automatically querying the plurality of assets to set the option responsive the received request to set an option.

17. A method for network asset recovery comprising:

querying assets on a communications network to obtain a current inventory of the assets on the communications network and an identification of which of the assets on the communications network has a port in service;

obtaining inventory data for the communications network from an inventory management database;

obtaining an identification of ones of the assets scheduled to be utilized;

comparing the current inventory and identification of which assets on the communications network has a port in service with the inventory data from the inventory management database to identify a plurality of non-utilized assets, including identifying assets that are not currently utilized as non-utilized assets only if they are not scheduled to be utilized; and identifying at least one of the non-utilized assets for recovery.

18. The method of claim 17 wherein the assets comprise intelligent network elements and wherein the communications network comprises a telecommunications network.

19. The method of claim 18 further comprising:

automatically generating a work order requesting recovery of the at least one of the non-utilized assets; and communicating the generated work order to a work force control system.

20. The method of claim 19 further comprising:

obtaining an identification of ones of the assets scheduled to be utilized;

determining if the work order requesting recovery of the at least one of the non-utilized assets requests recovery of one of the assets scheduled to be utilized; and updating the work order to cancel requesting recovery of the one of the assets scheduled to be utilized if the work order requests recovery of the one of the assets scheduled to be utilized.

21. The method of claim 18 wherein querying assets on the communications network comprises determining active services supported by the assets and wherein the method further comprises:

obtaining billing information associated with the communications network that identifies valid services from a billing database; and comparing the identified valid services and the determined active services to identify active services not corresponding to a valid service.

22. The method of claim 21 further comprising:

terminating an active service not corresponding to a valid service; or updating the billing database to incorporate an active service not corresponding to a valid service.

23. The method of claim 18 wherein the inventory management database comprises a plurality of inventory management databases including an interoffice network database and an outside plant database and wherein updating the inventory management database comprises updating each of the inventory management databases based on the current inventory.

24. A method for network asset revenue recovery comprising:

querying assets on a communications network to determine active services supported by the assets;

obtaining billing information associated with the communications network that identifies valid services from a billing database;

comparing the identified valid services and the determined active services to identify active services not corresponding to a valid service; and reconciling active services not corresponding to a valid service, wherein reconciling comprises: terminating an active service not corresponding to a valid service; or updating the billing database to incorporate an active service not corresponding to a valid service.

25. The method of claim 24 wherein the assets comprise intelligent network elements and wherein the communications network comprises a telecommunications network.

26. A method for network asset recovery comprising:
querying assets on a communications network to obtain a current inventory of the assets on the communications network;
obtaining inventory data for the communications network from an inventory management database;
comparing the current inventory with the inventory data from the inventory management database to identify a plurality of non-utilized assets;
identifying at least one of the non-utilized assets for recovery;
automatically generating a work order requesting recovery of the at least one of the non-utilized assets; and
communicating the generated work order to a work force control system.

27. The method of claim 26 wherein the assets comprise intelligent network elements and wherein the communications network comprises a telecommunications network.

28. The method of claim 27 wherein the method further comprises obtaining an identification of ones of the assets scheduled to be utilized and wherein comparing the current inventory with the inventory data from the inventory management database further comprises identifying assets that are not currently utilized as non-utilized assets only if they are not scheduled to be utilized.

29. The method of claim 27 further comprising:
obtaining an identification of ones of the assets scheduled to be utilized;
determining if the work order requesting recovery of the at least one of the non-utilized assets requests recovery of one of the assets scheduled to be utilized; and
updating the work order to cancel requesting recovery of the one of the assets scheduled to be utilized if the work order requests recovery of the one of the assets scheduled to be utilized.

30. The method of claim 27 wherein querying assets on the communications network comprises determining active services supported by the assets and wherein the method further comprises:
obtaining billing information associated with the communications network that identifies valid services from a billing database; and
comparing the identified valid services and the determined active services to identify active services not corresponding to a valid service.

31. The method of claim 30 further comprising:
terminating an active service not corresponding to a valid service; or
updating the billing database to incorporate an active service not corresponding to a valid service.

32. A network asset revenue recovery system, comprising:
an asset query module configured to query assets on a communications network to determining active services supported by the assets;
a billing query module configured to obtain billing information associated with the communications network that identifies valid services from a billing database; and
a reconciliation module configured to compare the identified valid services and the determined active services to identify active services not corresponding to a valid service and to reconcile any active services not corresponding to a valid service, wherein the reconciliation module is configured to terminate an active service not corresponding to a valid service or update the billing database to incorporate an active service not corresponding to a valid service.

33. The system of claim 32 wherein the assets comprise intelligent network elements and wherein the communications network comprises a telecommunications network.

34. A network asset recovery system, comprising:
an asset query module configured to query assets on a communications network to obtain a current inventory of the assets on the communications network;
an inventory database query module configured to obtain inventory data for the communications network from an inventory management database;
a reconciliation module configured to compare the current inventory with the inventory data from the inventory management database to identify a plurality of non-utilized assets, identifying at least one of the non-utilized assets for recovery and automatically generate a work order requesting recovery of the at least one of the non-utilized assets; and
a communication module configured to communicate the generated work order to a work force control system.

35. The system of claim 34 wherein the assets comprise intelligent network elements and wherein the communications network comprises a telecommunications network.

36. A computer program product comprising a computer usable storage medium having computer-readable program code embodied in the medium, the computer-readable program code comprising:
computer-readable program code that is configured to query network assets on the communications network to obtain a current inventory of the assets on the communications network;
computer-readable program code that is configured to obtain inventory data for the communications network from an inventory management database;
computer-readable program code that is configured to obtain asset type need data from a demand database, wherein asset type need data comprises data for forecasting a need for assets; and
computer-readable program code that is configured to compare the current inventory with the inventory data from the inventory management database to identify a plurality of non-utilized assets and identify at least one of the non-utilized assets for recovery based on the obtained asset type need data.

* * * * *